US012589375B2

(12) United States Patent
Potthoff et al.

(10) Patent No.: US 12,589,375 B2
(45) Date of Patent: Mar. 31, 2026

(54) FLUID BED GRANULATOR

(71) Applicants: thyssenkrupp Fertilizer Technology GmbH, Dortmund (DE); thyssenkrupp AG, Essen (DE)

(72) Inventors: Matthias Potthoff, Dortmund (DE); Harald Franzrahe, Dortmund (DE)

(73) Assignees: thyssenkrupp Fertilizer Technology GmbH, Dortmund (DE); thyssenkrupp AG, Essen (DE)

( * ) Notice: Subject to any disclaimer, the term of this patent is extended or adjusted under 35 U.S.C. 154(b) by 983 days.

(21) Appl. No.: 17/772,097

(22) PCT Filed: Oct. 30, 2020

(86) PCT No.: PCT/EP2020/000185
§ 371 (c)(1),
(2) Date: Apr. 26, 2022

(87) PCT Pub. No.: WO2021/083541
PCT Pub. Date: May 6, 2021

(65) Prior Publication Data
US 2022/0370974 A1 Nov. 24, 2022

(30) Foreign Application Priority Data
Oct. 31, 2019 (DE) ..................... 10 2019 216 894.9

(51) Int. Cl.
*B01J 2/16* (2006.01)
*B01J 2/04* (2006.01)
(Continued)

(52) U.S. Cl.
CPC . *B01J 2/16* (2013.01); *B01J 2/04* (2013.01); *B01J 8/0015* (2013.01); *B01J 8/36* (2013.01);
(Continued)

(58) Field of Classification Search
CPC ..... B01J 8/36; B01J 8/44; B01J 8/0015; B01J 8/003; B01J 2/04; B01J 2/16; B01J 2208/00761; B01J 2208/00769
See application file for complete search history.

(56) References Cited

U.S. PATENT DOCUMENTS

| 2,455,092 A | 11/1948 | Ramseyer et al. |
| 4,219,589 A | 8/1980 | Niks et al. |

(Continued)

FOREIGN PATENT DOCUMENTS

| DE | 29 04 121 C2 | 12/1979 |
| DE | 31 16 778 A1 | 2/1982 |

(Continued)

OTHER PUBLICATIONS

English Translation of International Search Report Issued in PCT/EP2020/000185 dated Mar. 7, 2021.

*Primary Examiner* — Lessanework Seifu
(74) *Attorney, Agent, or Firm* — thyssenkrupp North America, LLC

(57) ABSTRACT

A fluidized bed granulator for production of urea-containing or nitrate-containing granules may include a granulator interior having granulator interior walls with a first granulator side wall, a second granulator side wall, a granulator front wall that extends transversely to the granulator side walls, and a granulator back wall that likewise extends transversely at the opposite end of the granulator interior from the granulator front wall, a horizontal perforated plate that bounds the granulator interior in a downward direction, a seed entry opening, and a granule exit opening that is disposed at a distance in front of the granulator back wall. A process for producing urea-containing or nitrate-containing granules may utilize the fluidized bed granulator.

27 Claims, 5 Drawing Sheets

(51) Int. Cl.

| | |
|---|---|
| *B01J 8/00* | (2006.01) |
| *B01J 8/36* | (2006.01) |
| *C05C 1/02* | (2006.01) |
| *C05C 9/00* | (2006.01) |
| *B01J 8/44* | (2006.01) |

(52) U.S. Cl.
CPC ................ *C05C 1/02* (2013.01); *C05C 9/005* (2013.01); *B01J 8/44* (2013.01); *B01J 2204/005* (2013.01); *B01J 2208/00761* (2013.01)

(56) References Cited

U.S. PATENT DOCUMENTS

| | | | | |
|---|---|---|---|---|
| 4,237,814 | A | * 12/1980 | Ormos | B01J 8/26 |
| | | | | 118/DIG. 5 |
| 4,330,319 | A | 5/1982 | Bexton et al. | |
| 4,343,622 | A | 8/1982 | Bruynseels | |
| 4,701,353 | A | 10/1987 | Mutsers et al. | |
| 5,357,688 | A | * 10/1994 | Christensen | B01J 8/36 |
| | | | | 34/360 |
| 5,695,701 | A | * 12/1997 | Funder | B01J 8/44 |
| | | | | 425/222 |
| 6,159,252 | A | 12/2000 | Schutte et al. | |
| 6,203,730 | B1 | 3/2001 | Honda et al. | |
| 7,128,936 | B1 | 10/2006 | Hansen | |
| 7,727,485 | B2 | 6/2010 | Eygelaar | |
| 8,466,315 | B2 | 6/2013 | Niehues et al. | |
| 2008/0299305 | A1 | 12/2008 | Bedetti | |
| 2016/0175797 | A1 | 6/2016 | Potthoff et al. | |

FOREIGN PATENT DOCUMENTS

| | | | |
|---|---|---|---|
| DE | 43 16 320 | A1 | 11/1994 |
| DE | 195 14 187 | C1 | 5/1996 |
| DE | 10 2017 207 035 | A1 | 10/2018 |
| EP | 0 900 589 | A1 | 3/1999 |
| EP | 1 581 333 | B1 | 10/2005 |
| EP | 2 832 439 | A1 | 2/2015 |
| JP | 2010-167415 | A | 8/2010 |
| RU | 2163901 | C1 | 3/2001 |
| RU | 90353 | U1 | 1/2010 |
| RU | 114873 | U1 | 4/2012 |
| WO | 2010/060535 | A1 | 6/2010 |

* cited by examiner

FLUID BED GRANULATOR

CROSS REFERENCE TO RELATED APPLICATIONS

This application is a U.S. National Stage Entry of International Patent Application Serial Number PCT/EP2020/000185, filed Oct. 30, 2020, which claims priority to German Patent Application No. DE 10 2019 216 894.9, filed Oct. 31, 2019, the entire contents of both of which are incorporated herein by reference.

FIELD

The present disclosure generally relates to fluidized bed granulators for production of urea-containing granules and to processes for producing a urea-containing granular material.

BACKGROUND

With regard to global population growth, the development of flexible and efficient fertilizers is of major and increasing significance. What is important here is not only the fertilizer itself, i.e. the chemical composition, but also the processing operations in transportable containers and deployment onto the field. The greatest significance here certainly attaches to the granulation to give uniform particles of identical size and characteristics. Important parameters here are low dust formation, strength, low tendency to aggregation, homogeneous size, storability and stability. An established granulation technique is fluidized bed granulation, which has improved particle properties compared to prilling and pelletizing techniques, for example.

One example for production of a urea-containing fertilizer granular material by means of fluidized bed granulation can be found in WO 2010/060535 A1, for example in paragraphs [0025]-[0035], FIG. 1, or U.S. Pat. No. 4,701,353 A, DE 31 16 778 A1 and U.S. Pat. No. 4,219,589 A.

A very high proportion of global fertilizer production is accounted for by urea-containing fertilizers. This water-soluble fertilizer breaks down in the soil to give ammonium salts or nitrates, and is an important base fertilizer. This urea-containing fertilizer can be combined with further elements such as potassium, phosphates or sulfur compounds.

The use of urea-sulfur fertilizers in agriculture has long been known. In such fertilizer mixtures, the plant can be provided simultaneously with the two elements nitrogen and sulfur, such that steps and costs for deployment of a further fertilizer can be dispensed with. In combination with urea, this enables, for example, supply of the sown plants at an early stage with nitrogen via the urea, and with sulfur in the subsequent growth phases.

For that reason, urea-sulfur fertilizers having a homogeneous distribution of urea and sulfur are of increasingly greater significance. Examples can be found, for example, in U.S. Pat. No. 4,330,319 A.

Modern granulation plants for urea-containing fertilizer granules enable production volumes in the range from 2000 t (tonnes) to 4000 t (tonnes) per day. These production volumes simultaneously also require corresponding dimensions of the fluidized bed granulator. In an illustrative fluidized bed granulator, the granule exit is on a narrow side of the fluidized bed granulator, and the granule/seed inlet on the opposite side of the fluidized bed granulator. In the case of small fluidized bed granulators (up to about 30 m²), this is generally not a problem in industrial implementation.

For further transport of the granular material into the screening/grinding circuit, there is frequently firstly a coarse screen disposed at the fluidized bed granulator exit for removal of large agglomerates or oversize particles, and then at least one bucket conveyor that conveys the granular material upward in the granulation building to the screens. From this highest point in the granulation plant, the solid material then preferably moves exclusively on the basis of gravity to all further process steps and apparatuses in the granulation plant. From the screens, for example, about 30% of the granular material is returned to the entry side of the fluidized bed granulator as seed/return flow via inclined chutes. The entry side is opposite the exit side; the two each form a narrow side of the fluidized bed granulator. The inclination of these chutes is chosen such that the product flows freely on the one hand, but on the other hand does not go into freefall, in order to assure a homogeneous product flow. The effect of this is that the external bridging of a horizontal distance between the granule exit side and the seed entry side also results in an increase in the height of the building, for example by a factor of 1.2 to 1.7. As a result, not only does the bucket conveyor that conveys the granular material upward become correspondingly higher, but also the whole building, and there is a large amount of unutilized building volume. Thus, with the existing design with increasing fluidized bed granulator length, the building accommodating the fluidized bed granulator becomes ever higher.

EP 2 832 439 A1 discloses a coated fluidized bed granulator and the illustrative construction.

EP 1 581 333 B1 discloses a fluidized bed granulator in compact design for the granulation of nitrate-containing particles.

EP 0 900 589 A1 discloses an energy-saving fluidized bed granulator and a process, wherein the recycling of product particles can be dispensed with.

Thus, a need exists for a fluidized bed granulator that does not have the above-described disadvantages of the prior art. A need also exists for a granulation building that has a very compact design with a small amount of unutilized space even in the case of high production volumes of urea-containing granules and hence very long fluidized bed granulators.

DETAILED DESCRIPTION

Figure 1:
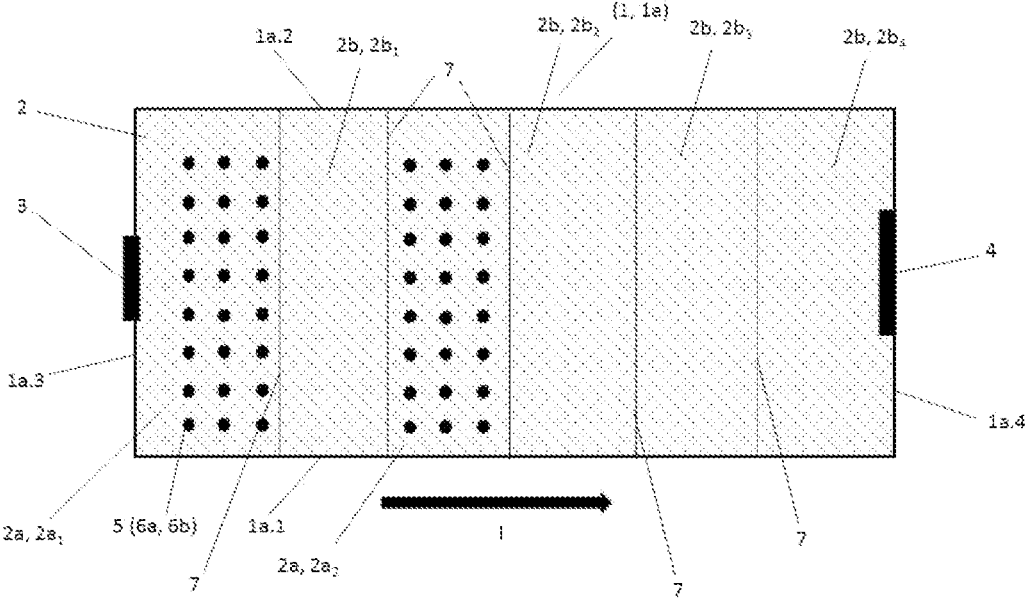
FIG. 1 is a schematic top view of a prior art fluidized bed granulator.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention further encompasses the use of the fluidized bed granulator of the invention for production of a urea-containing granular material.

The fluidized bed granulator of the invention for production of urea-containing or nitrate-containing granules comprises at least:

a granulator interior having granulator interior walls, at least comprising a first granulator side wall, a second granulator side wall, a granulator front wall that runs in transverse direction to the granulator side walls, and a granulator back wall that likewise runs in transverse direction at the opposite end of the granulator interior from the granulator front wall;

a horizontal perforated plate that bounds the granulator interior in the downward direction;

at least one seed entry opening and at least one granule exit opening;

wherein the at least one granule exit opening is disposed at a distance in front of the granulator back wall.

In a preferred development of the present invention, the at least one granule exit opening is disposed within the perforated plate.

In a preferred development of the present invention, at least one deflection device provided in the granulator interior brings about a deflection of the flow of the granular material in the granulator interior in such a way that the granule particles are deflected at least once in a direction other than their initial flow direction toward the granule exit opening.

In a preferred development of the present invention, at least one deflection device provided in the granulator interior brings about a multiple deflection of the flow of the granule particles in the granulator interior differently than their initial flow direction toward the granule exit opening.

In a preferred development of the present invention, at least one deflection device provided in the granulator interior brings about a deflection of the flow of the granule particles in the granulator interior by a total of about 180° differently than their initial flow direction toward the granule exit opening.

In a preferred development of the present invention, the deflection device comprises at least one deflection plate which extends roughly in flow direction of the granule particles or at an acute angle to the flow direction of the granule particles and is disposed at a distance from the granulator side walls.

In a preferred development of the present invention, the deflection device comprises at least two deflection plates that form an acute angle or a right angle with one another or are arranged parallel to one another.

In a preferred development of the present invention, the deflection device furthermore comprises at least two deflection plates, of which a first deflection plate extends roughly in flow direction of the granule particles, optionally at a distance alongside the granule exit opening, and a second deflection plate extends in front of the granule exit opening roughly transverse to the flow direction of the granule particles.

Rather than individual deflection plates that form an acute angle or a right angle with one another and hence shield the granule exit opening at first from granule particles flowing in the original flow direction and bring about the deflection, it is also possible, for example, to provide a curved deflection plate shaped in such a way that it shields the granule exit opening at one, two or three sides, but having an opening at least on the side facing the granulator back wall, such that deflected granule particles are thence guided into the granule exit opening.

The fluidized bed granulator of the invention comprises at least one granulator interior having granulator interior walls. The granulator interior walls comprise at least one first granulator side wall (preferably as a long side of the fluidized bed granulator), a second granulator side wall (preferably as a long side of the fluidized bed granulator), a granulator front wall (preferably as a short side or narrow side) and a granulator back wall (preferably as a short side or narrow side). Disposed within the granulator interior, preferably horizontally above the interior base, is a perforated plate. Spray nozzles are preferably mounted within, above or on the perforated plate. Alternatively, the spray nozzles may also be arranged separately from the perforated plate, for example above the perforated plate or laterally in the granulator space (for example on the granulator side walls). The spray nozzles are preferably connected by atomization gas feeds and melt feed conduits for the guiding of the urea-containing fertilizer melt. The expression "urea-containing fertilizer melt" in the context of the invention also comprises (within the scope of technical purity and with a water content of generally 1% by weight to 10% by weight) pure urea melts or urea solutions or pure urea melts or urea solutions with a granulating additive, for example formaldehyde, polyvinylamines, polyethylenevinyls (e.g. polyethyleneamine), polyethyleneimines, carboxylic acids and/or aldehydes. Optionally, the atomization gas feeds and melt feed conduits may also be implemented in a combined conduit. The expression "atomization gas feed" in the context of the invention encompasses gas feeds which, together with the melt to be granulated from the melt feed conduits, produce finely divided melt droplets in the spray nozzles ("atomized" droplets). The expression "atomization" in the context of the invention does not mean the division or breakdown of the melt droplets into individual atoms, but rather the generation of small melt droplets, preferably in the range from 1 to 200 μm. The expression "melt" in the context of the invention encompasses concentrated solutions, suspensions, emulsions or dispersions, preferably having a proportion of the component to be dissolved in the urea-containing melt of greater than 0.5% by weight, up to 50% by weight, more preferably less than 30% by weight. Additionally included are one or more seed entry openings and one or more granule exit openings, with the distance between the seed entry opening(s) and the granule exit opening(s) defining a (theoretical) granule flow direction. The expression "seed entry opening" describes one or more openings or feeds via which relatively small particles (smaller than the desired granule size) are introduced into the fluidized bed granulator as seed particles. The spray nozzles are used to contact the seed particles with melt droplets. This accretion results in continuous growth of the seed particles. The particles preferably have a "raspberry-like" appearance at the microscopic level as a result of the growth, consisting of a core with molten solidified (crystallized) droplets.

The fluidized bed granulator of the invention is characterized in that the granule exit opening is disposed at a distance from and in front of the granulator back wall. As a result, the granular material is not, as in the case of a conventional fluidized bed granulator, discharged at the furthest removed end of the granulator interior based on the seed entry opening, but rather is deflected by means of a suitable deflection device in a direction other than the main flow direction and fed to the granule exit opening in a region that is at a distance in front of the granulator back wall viewed in flow direction.

In addition, the granule exit opening is disposed within the perforated plate. The granule exit opening, in the configuration of the invention, is surrounded, for example, by deflection plates, preferably in a u shape, with no deflection plate or a deflection plate with an opening provided opposite the granulator back wall. The deflection plates here result in circumventing flow with subsequent deflection of the granule particles present in the fluidized bed first past the granule exit opening and then in reverse flow direction within the deflection plates into the granule exit opening. The granule exit can thus be disposed within the granulator interior. This surprisingly reduces the distance between granule exit (granule exit opening) and return/seed inlet (seed entry opening) of the fluidized bed granulator by about 20-50%. The movement of the granule exit correspondingly reduces the required height of the bucket conveyor, and the building height of the granulation building.

Preferably, the granulator interior includes a fluidization gas feed, and spray nozzles disposed in or on the perforated plate with feeds for melt and feeds for atomization gas. The feeds for melt and feeds for atomization gas can be implemented via individual or combined feeds. The fluidization gas feed enables the introduction of an air stream or gas stream that generates a fluidized bed of granule particles above the perforated plate from the bottom through the perforated plate.

The granulator interior preferably comprises growth zones and cooling zones above the perforated plate. Preferably, disposed in the growth zones as described above are spray nozzles in the perforated plates, the cooling zones lack spray nozzles, or there are possibly fewer spray nozzles than in the growth zones. The alternation of growth zones and cooling zones enables control of particle growth and of temperature distribution. This is especially useful for avoidance of biuret at high temperatures.

In a preferred configuration, two seed entry openings are disposed in the region of the granulator front wall. In addition, depending on the size of the fluidized bed granulator, further seed entry openings may be disposed in the first and second granulator side walls. In the context of the invention, further seed entry openings are optionally also possible in other places. More preferably, a third and a fourth seed entry opening are disposed in conjunction with a growth zone. The additional seed entry openings enable control and additional temperature control of the process of growth of the granule particles.

The granulator exit opening is preferably disposed within the perforated plate and does not touch the granulator back wall.

In a further preferred configuration, the deflection plates (8.1, 8.1+i with i=0, 1, 2, 3, . . . ) are arranged in a U shape or such that they ensheath the granule exit opening. The expression "U-shaped or ensheathing" also includes a round, rounded, straight, angular arrangement of the deflection plates. Illustrative geometries include a rectangular or square arrangement in which the side opposite the granulator back wall is absent or has an opening for passage of the granular material.

Further preferably, dividing walls are disposed between the growth zones and cooling zones; the dividing walls preferably comprise passage openings. More preferably, the passage openings in the lower region are arranged adjacent to or adjoining the perforated plate.

In a further preferred configuration, the deflection plate is designed as a portion of a dividing wall. This configuration also includes a section of the dividing wall that does not have any passage opening for the granule particles.

Further preferably, the granule exit opening is disposed within a cooling zone.

Preferably, the granule exit opening is connected via a coarse screen for removal of coarse lumps and oversize granule agglomerates to a conveying device, for example one or two downstream bucket conveyors or other conveying units. The expression "connected" in the context of the invention includes further intermediate components, for example fluidized bed coolers. The conveying device enables the further transport of the cooled granular material in the granulation building in the upward direction to a screen apparatus which is preferably disposed there. The screen apparatus enables separation of the granule particles into granule particles within the preferred size range (for example frequently 2 mm to 4 mm for urea-containing particles), particles smaller than the preferred size range, and particles larger than the preferred size range. The particles larger than the preferred size range are preferably comminuted in a crusher or mill and recycled into the granulator interior via the seed entry opening(s) together with the particles smaller than the preferred size range as seed particles. The seed particles are preferably recycled solely under gravity, in order to minimize apparatus complexity for the seed particle transport. For this purpose, for example, chutes are used, the angles of inclination of which are greater than the angle of repose of the granular material. This arrangement essentially determines the height of the granulation building.

In a further preferred configuration, the conveying device, viewed in granule flow direction, is disposed at a distance of 20% to 80% of the total length of the first or second granulator side wall from the outer edge of the first or second granulator side wall. The inventive configuration of the fluidized bed granulator enables a central arrangement of the conveying device based on the longitudinal side of the fluidized bed granulator. What is meant in the context of the invention by the expression "disposed at a distance of 20% to 80% of the total length of the first or second granulator side wall from the outer edge of the first or second granulator side wall" is that the conveying device is disposed at a distance of 20% to 80% of the total length of the first or second granulator side wall from the granulator front wall. In the case of an illustrative side length of the first or second granulator side wall of 20 m, the conveying device is disposed alongside the first or second granulator side wall at a distance from the granulator front wall of 4 m (20%) to 16 m (80%) outside the granulator interior. The more central arrangement of the conveying device and of the downstream screen apparatus allows the total building height of the granulation building to be reduced, since the distance to be covered with the aid of the inclined chutes from the conveying device to the seed entry opening is reduced. The expression "arranged" relates to the center of the footprint of the conveying device.

In an alternative configuration, the granule exit opening is either connected, preferably by a coarse screen for removal of coarse lumps and oversize granule agglomerates, to a separate fluidized bed cooler, or the granule exit opening is not connected to a separate fluidized bed cooler. More preferably, the granule exit opening is not connected to any separate fluidized bed cooler. In this configuration, fluidized bed granulator and fluidized bed cooler are combined in the fluidized bed granulator of the invention.

Preferably, the perforated plate has inclined openings; more preferably, the inclined openings have an angle of 20° to 60° relative to the surface of the perforated plate. The expression "inclined openings" in the context of the invention encompasses arrangements in the perforated plate of openings, punchings, recesses, elevations, notches and similar elements introduced into, arranged in or obtained by deformation of the perforated plate, which enable deflection of the air stream differently from the vertical spread by means of a simple planar, possibly ring-shaped, opening. The inclined openings preferably have a maximum diameter of 1 mm to 3 mm.

Further preferably, the inclined openings are inclined in different directions, more preferably in a granule flow direction, more especially preferably in the granule flow direction around the deflection plates in the direction of the granule exit opening. The arrangement of differently inclined openings assists the guiding of the granule particles through the fluidized bed granulator and along the deflection plates into the granule exit opening.

The invention further encompasses a process for producing a urea-containing or nitrate-containing granular material, at least comprising the steps that follow. In a first step, a urea-containing and/or nitrate-containing melt, or a concentrated urea-containing solution, is provided. The melt preferably still contains a proportion by weight of 1% to 5% by weight of water; more preferably, the remaining proportions by weight comprise urea, elemental sulfur, granulating additives, emulsifying additives and/or ammonium sulfate. In a subsequent step, the urea-containing melt is sprayed into a fluidized bed granulator filled with fluidized granule particles as described above. In a further step, the urea-containing and/or nitrate-containing melt is granulated, and a urea-containing or nitrate-containing granular material is obtained. The precipitation of the melt droplets on the fluidized particles results in solidification of the melt on the surface of the particles, giving a urea-containing or nitrate-containing granular material.

Preferably, the urea-containing melt used in the process of the invention contains ammonium sulfate, elemental sulfur, ammonium nitrate, trace elements, granulating additives, emulsifying additives and/or mixtures thereof. More preferably, the urea-containing melt contains 2% by weight to 30% by weight of sulfur, especially preferably 5% by weight to 20% by weight of sulfur. The expression "urea-containing fertilizer melt" in the context of the invention also includes (within the scope of technical purity and with a water content of generally 2% by weight to 10% by weight) pure urea melts or urea solutions, or pure urea melts or urea solutions with a granulating additive, for example formaldehyde, polyvinylamines, polyethylenevinyls (e.g. polyethyleneamine), polyethyleneimines, carboxylic acids and/or aldehydes.

The invention further relates to the use of a fluidized bed granulator of the invention as described above for production of a urea-containing granular material, more preferably an elemental sulfur and/or ammonium sulfate-containing urea-containing granular material.

The invention is described in detail hereinafter with reference to figures. The figures are not to scale and do not restrict the invention to the executions shown therein.

FIG. 1 shows a schematic top view of a conventional fluidized bed granulator according to the prior art, comprising at least one granulator interior 1 with granulator interior walls 1a bounding said granulator interior. The granulator interior walls 1a comprise at least one first, roughly vertical granulator side wall 1a.1 which is preferably inclined outward slightly away from the center line of the fluidized bed granulator in the upward direction, which bounds the granulator interior along a first longitudinal side, a second, roughly vertical granulator side wall 1a.2 which is preferably inclined outward slightly away from the center line of the fluidized bed granulator in the upward direction, which runs parallel and at a distance from the first granulator side wall and bounds the granulator interior along its second longitudinal side, a preferably roughly vertical granulator front wall 1a.3 that preferably runs in transverse direction to the two granulator side walls and connects these to one another, and a preferably roughly vertical granulator back wall 1a.4 that runs at a distance from and preferably parallel to the granulator front wall and hence is opposite the granulator front wall. Thus, the fluidized bed granulator shown in the working example has a granulator interior of preferably rectangular outline, which could possibly even be square. By way of simplification, in the present application, the term "longitudinal side" is used, which corresponds to the extension of the fluidized bed granulator in conveying direction of the granule particles in the granulator interior as indicated by the arrow in FIGS. 1 and 2. The granulator front wall 1a.3 which is on the side on which the granule particles that do not meet the specification enter the granulator interior, and the granulator back wall 1a.4 which is on the side on which the granule particles exit from the granulator interior in a conventional fluidized bed granulator, thus run in transverse direction and transverse to the main conveying direction of the granule particles.

The granulator interior 1 in which the fluidized bed is produced from the granule particles is bounded at the bottom by a perforated plate 2 which generally runs horizontally and which, according to the representation, may for example (but not exclusively) extend over the entire length and over the entire width of the granulator interior 1. Thus, above this perforated plate 2, in a roughly cuboidal or trough-shaped volume, a fluidized bed of granule particles is generated. In, above or on the perforated plate are mounted multiple spray nozzles 5 that are generally in a spaced-apart arrangement from one another, which may be arranged in rows, for example. The spray nozzles 5 are connected by atomization gas feeds and melt feed conduits (not shown). Additionally provided above the perforated plate 2 are one or more seed entry opening(s) 3 and, in the perforated plate 2, one or more granule exit opening(s) 4, with the distance between the seed entry opening 3 and the granule exit opening 4 defining a (theoretical) granule flow direction (I) (see arrow). The perforated plate 2 is (not shown) supplied with the fluidization medium from the bottom, for example air. The seed entry opening 3 permits the introduction of relatively small (smaller than the desired granule size) granule particles as seed particles into the fluidized bed granulator. Viewed in flow direction, the granulator interior also preferably comprises one or more dividing walls 7 that are each spaced apart from one another and extend in transverse direction of the granulator. The seed entry openings 3 may, viewed in granule flow direction, each be disposed between a first and a second dividing wall 7 at the granulator front wall 1*a*.3 and/or at the first granulator side wall 1*a*.1 and/or at the second granulator side wall 1*a*.2.

Via the spray nozzles 5 and the feeds (not shown) for the melt 6*a* and for atomization air 6*b*, the seed particles are contacted with melt droplets. This accretion results in continuous growth of the seed particles. The particles, as a result of the growth, preferably have a "raspberry-like" appearance at the microscopic level composed of a core with molten solidified (crystallized) droplets. The perforated plate 2 comprises growth zones (2*a*, 2*a_i*, with i=1, 2, 3, . . . ) and cooling zones (2*b*, 2*b_i*, with i=1, 2, 3, . . . ). In the growth zones (2*a*, 2*a_i*, with i=1, 2, 3, . . . ) are disposed spray nozzles 5; in the cooling zones there are no spray nozzles (2*b*, 2*b_i*, with i=1, 2, 3, . . . ) or, if appropriate, fewer spray nozzles 5 (not shown) are present than in the growth zones (2*a*, 2*a_i*, with i=1, 2, 3, . . . ). The alternation of growth zones (2*a*, 2*a_i*, with i=1, 2, 3, . . . ) and cooling zones (2*b*, 2*b_i*, with i=1, 2, 3, . . . ) enables control of particle growth and of temperature distribution. This is useful especially for avoidance of the formation of biuret at high temperatures. Additionally disposed between the growth zones 2*a* and cooling zones 2*b* in flow direction are dividing walls 7; preferably, the dividing walls comprise passage openings (not shown). These may, for example, be slots in the region of the underside of the dividing walls 7, which arise, for example, in that the dividing walls 7 end above the perforated plate 2, and hence passage openings for the granule particles are present in flow direction from one zone to the next.

Figure 2:
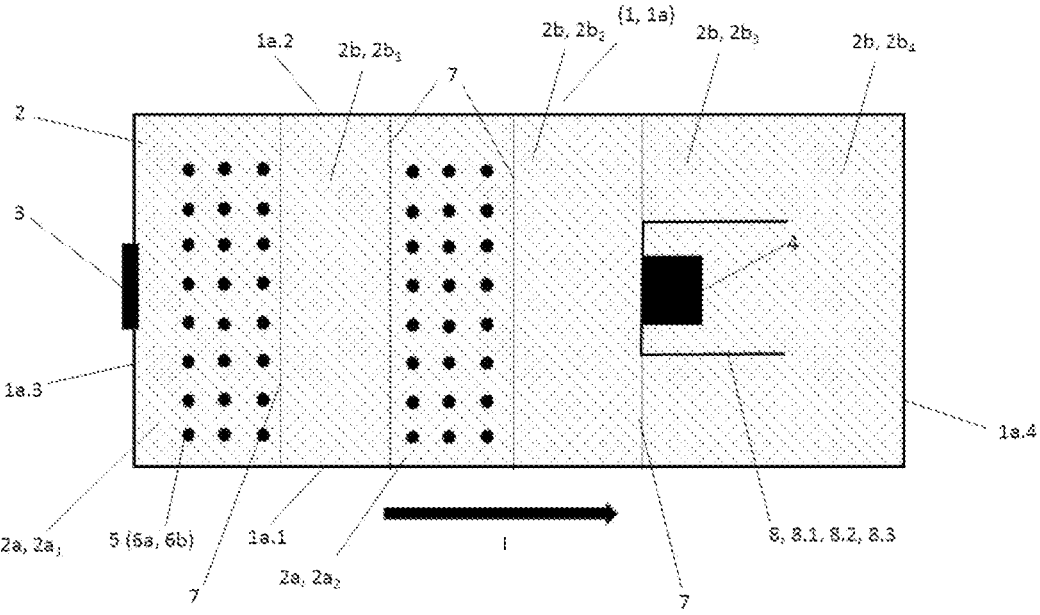
FIG. 2 is a schematic top view of an example fluidized bed granulator.

FIG. 2 shows a schematic top view of a fluidized bed granulator of the invention. The basic construction corresponds to the construction of a conventional fluidized bed granulator described above with reference to FIG. 1, and the features already described above will therefore not be repeated here. By comparison of the two FIGS. 1 and 2, it can be seen that, in the fluidized bed granulator of the invention, the granule exit opening is arranged at a distance in front of the granulator back wall 1*a*.4. Thus, the theoretical shortest distance between the granule exit opening 4 and the seed entry opening 3 and the granulator front wall 1*a*.3, given the same construction size of the fluidized bed granulator, is shorter in the case of the inventive solution than in the case of the conventional fluidized bed granulator according to FIG. 1, since, in the case of the latter, the granule exit opening 4 is in the region of the granulator back wall 1*a*.4 and hence, viewed from the seed entry opening 3, effectively at the opposite end of the fluidized bed granulator viewed in longitudinal direction.

In addition, the granule exit opening 4 is disposed within the perforated plate 2 and does not touch the granulator back wall 1*a*.4. The granule particles removed there then fall downward through the granule exit opening in the perforated plate 2, for example through a corresponding shaft. Subsequently, in a manner known per se, conveying devices and screens separate the different granule particle sizes from one another, and granule particles that do not meet the required specification are returned to the seed entry opening 3. These details are not shown in FIG. 2.

The granule exit opening 4, in the inventive configuration of multiple deflection plates 8, 8.1, 8.2, 8.3, is surrounded, for example, roughly in a U shape, in which case either no deflection plate 8 or (not shown) a deflection plate 8 with an opening is provided on the opposite side from the granulator back wall 1*a*.4. The deflection plates 8, 8.1, 8.2, 8.3 here result in circumventing flow with subsequent deflection of the granule particles present in the fluidized bed first past the granule exit opening 4 and then in reverse flow direction within the deflection plates 8, 8.1, 8.2, 8.3 into the granule exit opening 4. This reduces the distance between granule exit (granule exit opening 4) and return/seed inlet (seed entry opening 3) of the fluidized bed granulator, for example by about 20-50%. The movement of the granule exit opening 4 correspondingly reduces the height to be overcome by the conveying device and the building height of the granulation building, since the off-spec granule particles are recycled to the seed entry opening 3 in a region above the fluidized bed granulator, and the construction height of the apparatuses required for the purpose is reduced in the case of the inventive solution. This aspect will be elucidated in detail later on with regard to the schematic representations of FIGS. 6 and 7.

Figure 3:
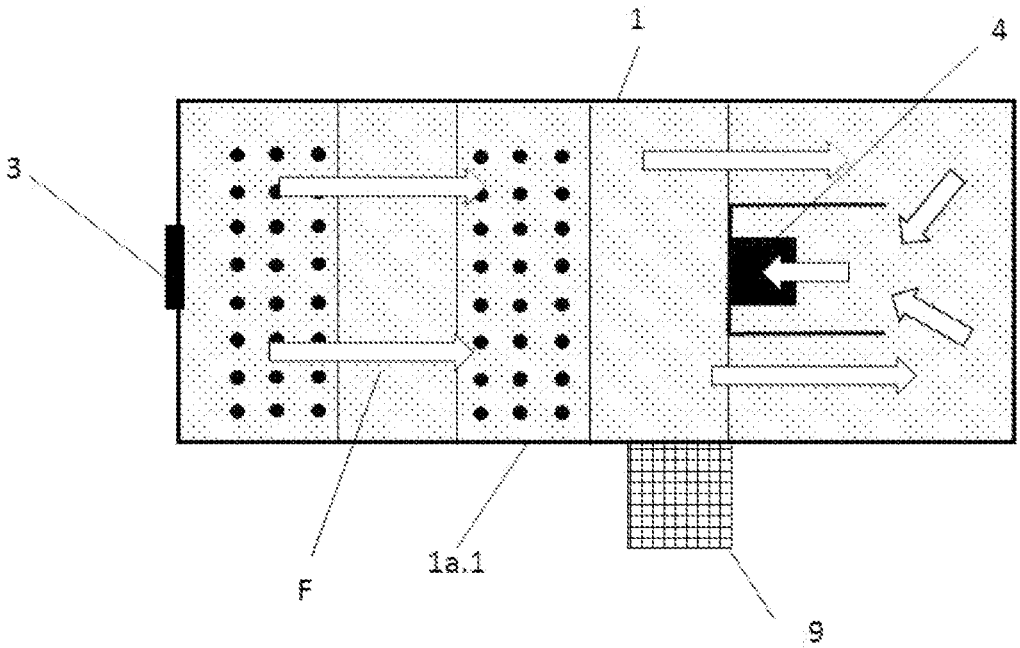
FIG. 3 is another schematic top view of an example fluidized bed granulator.

FIG. 3 shows a further schematic top view of a fluidized bed granulator of the invention. The fundamental construction corresponds to the construction described in FIG. 2. In the first granulator side wall 1*a*.1 there is disposed a conveying device 9. The conveying device 9 may alternatively be disposed in the second granulator side wall 1*a*.2. As a further alternative, one conveying device may be disposed in each of the two granulator side walls 1*a*.1, 1*a*.2. The flow direction F of the granule particles is indicated schematically by the arrows in FIG. 3. By contrast with prior art fluidized bed granulators, this permits, as described above, a much more compact design, especially in relation to the building height of the granulation building.

Figure 4:
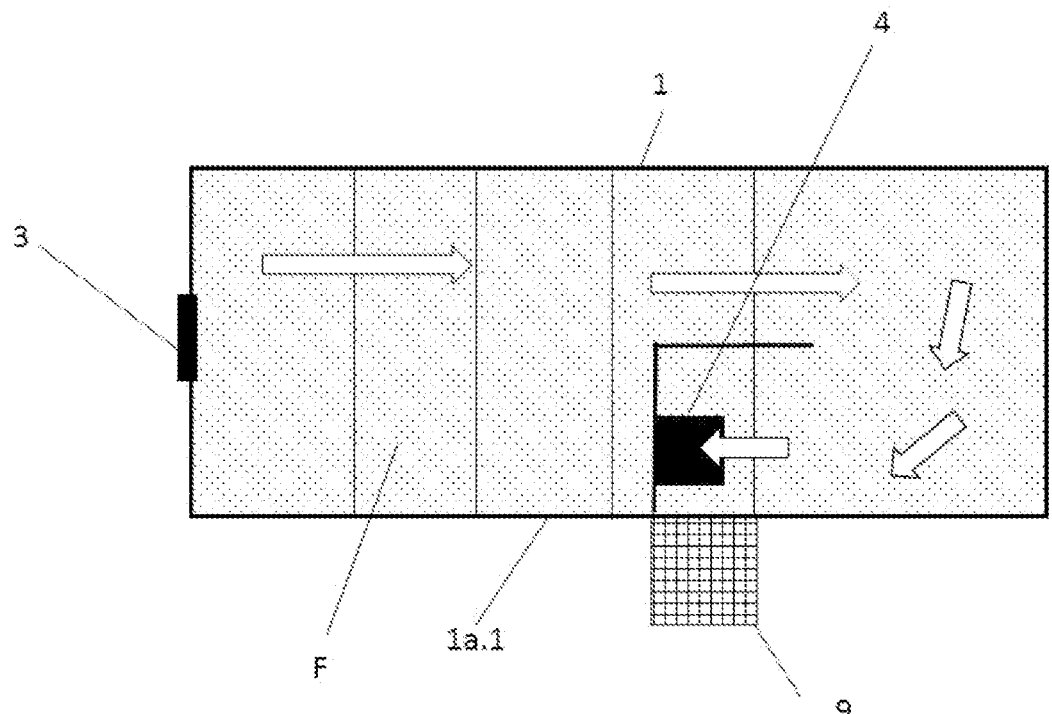
FIG. 4 is a schematic top view of another example fluidized bed granulator.

FIG. 4 shows a further schematic top view of an alternative configuration of the fluidized bed granulator of the invention. The basic construction corresponds to the construction described in FIG. 3. However, the granule exit opening 4 is disposed adjacent to the first granulator side wall 1*a*.1 and the conveying device 9 within the perforated plate 2. This arrangement reduces the transport distance to the conveying device 9.

Alternatively, a conveying device and a granule exit opening 4 may be disposed adjacent to the second granulator side wall 1*a*.2. A further alternative configuration is two granule exit openings each having a conveying device, each disposed adjacent to the first granulator side wall 1*a*.1 and to the second granulator side wall 1*a*.2.

Figure 5:
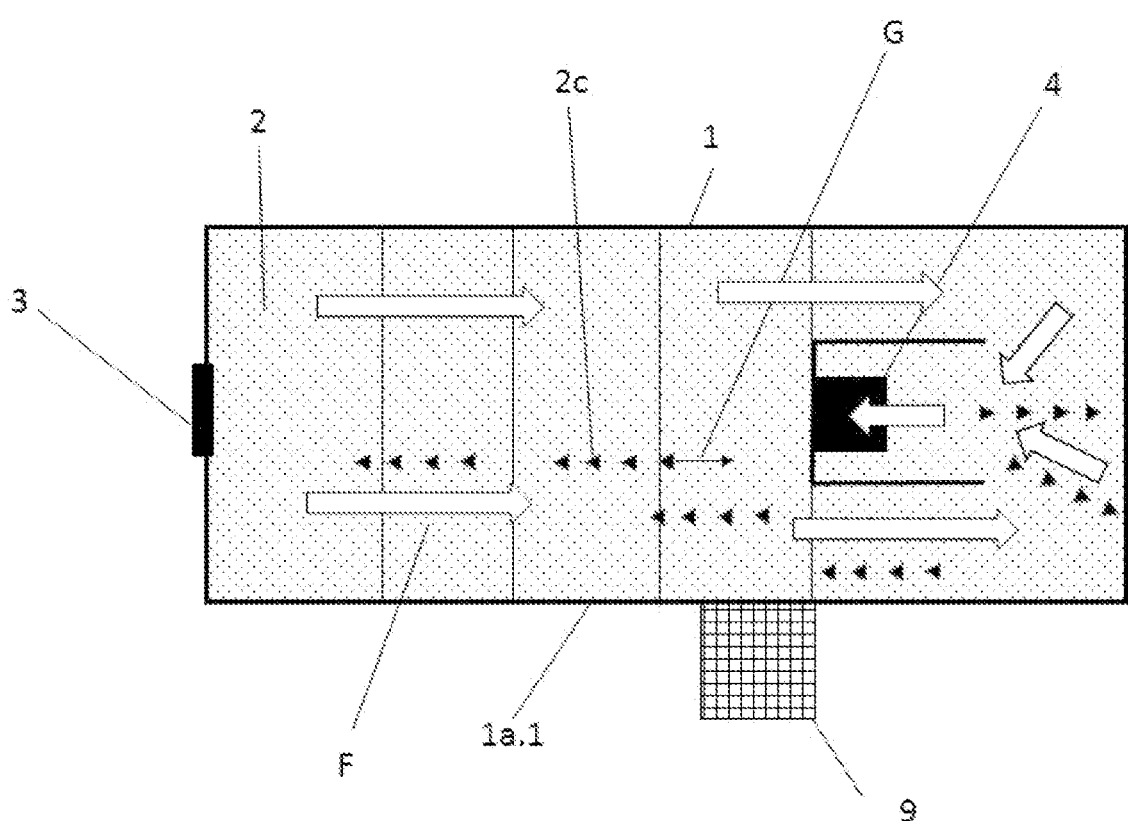
FIG. 5 is a further schematic top view of an example fluidized bed granulator.

FIG. 5 shows a further preferred schematic top view of the fluidized bed granulator of the invention. Indicated on the perforated plate 2, in significantly enlarged form compared to the real size, are schematic inclined openings 2*c*. In the installed perforated plate, the openings, for example, are of a size of 1 mm to 3 mm. For reasons of clarity, only individual inclined openings 2*c* are indicated. The flow direction of the air G or of the fluidization medium is indicated by way of example by the black arrow. The arrangement of the inclined openings 2*c* assists in steering the flow direction F of the granule particles.

Figure 6:
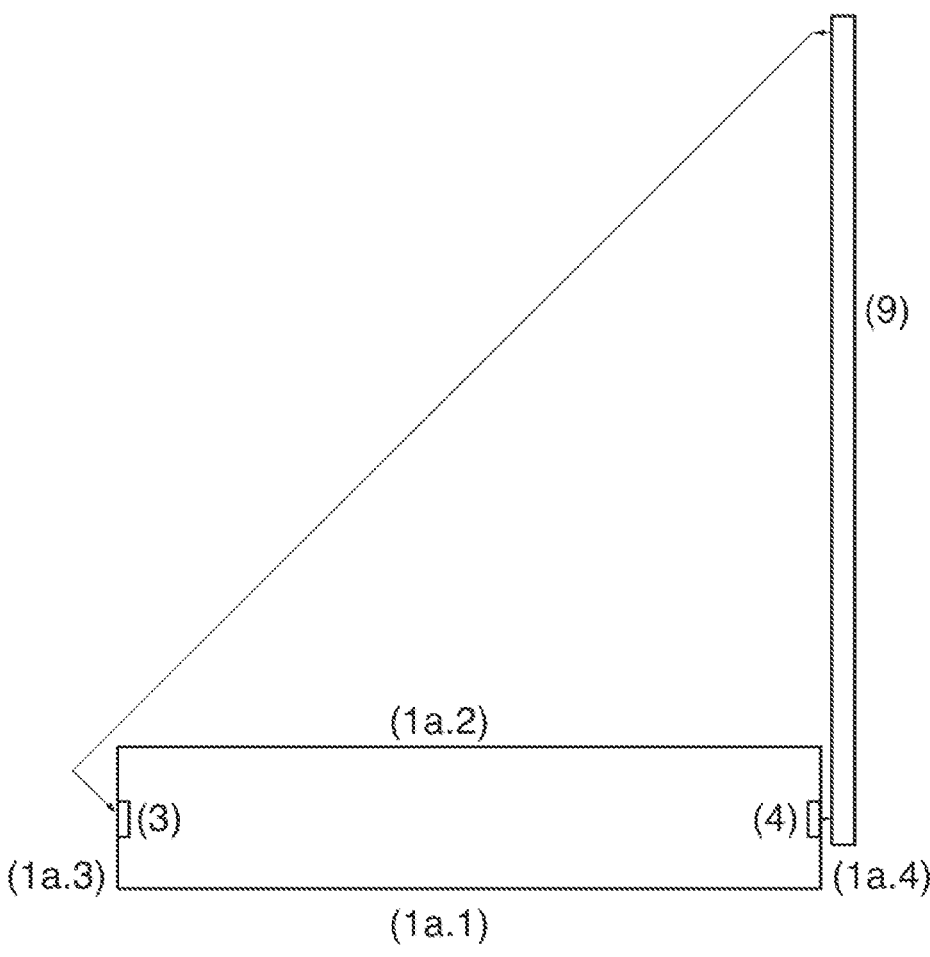
FIG. 6 is a schematically simplified side view of a prior art fluidized bed granulator according.
Figure 7:
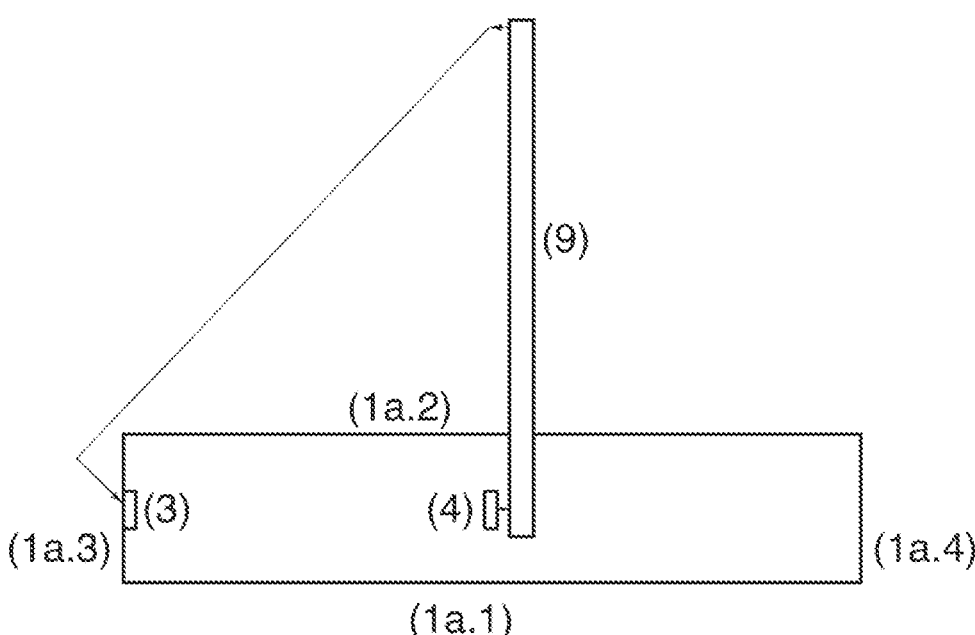
FIG. 7 is a schematically simplified side view of an example fluidized bed granulator.

A significant advantage of the inventive design of the fluidized bed granulator is elucidated below with reference to the schematic side views according to FIGS. 6 and 7. In each of the two drawings, the granulator front wall 1*a*.3 and the granulator back wall 1*a*.4 can be seen, between which the granule particles entering the granulator interior 1 at the seed entry opening 3 are conveyed in flow direction (longitudinal direction) toward the granule exit opening 4. Because this granule exit opening 4 is at the end of the granulator interior 1 in the conventional apparatus according to FIG. 6, the granule particles must cover the entire distance through the granulator interior before they reach the granule exit opening 4. Consequently, the schematically highly simplified conveying device 9 is disposed there, which must have a corresponding construction height in order to be able to recycle the off-spec granule particles via the screens disposed above the fluidized bed granulator as seed back to the seed entry opening 3.

In the case of the inventive solution, by contrast, the granule exit opening 4 and hence also the conveying device 9 proceeding therefrom is more in a middle region of the granulator side wall, at a considerable distance from the granulator back wall 1a.4, such that the distance over which the off-spec granule particles have to be returned to the granulator front wall 1a.3 and the seed entry opening(s) 3 disposed there is considerably shorter and, correspondingly, the construction height of the conveying device 9 and of the granulation building can also be significantly reduced.

LIST OF REFERENCE NUMERALS

1 granulator interior
1a granulator interior walls
1a.1 first granulator side wall
1a.2 second granulator side wall
1a.3 granulator front wall
1a.4 granulator back wall
2 perforated plate
2a$_i$ growth zone
2b$_i$ cooling zone
2c inclined openings
3 seed entry opening(s)
4 granule exit opening(s)
5 spray nozzles
6a feeds for melt
6b feeds for atomization gas
7 dividing walls
8$_i$ deflection device/deflection plates
9 conveying device
F flow direction of the granule particles
G flow direction of the air or of the fluidization medium

What is claimed is:

1. A fluidized bed granulator for production of granules that contain urea or nitrate, the fluidized bed granulator comprising:
    a granulator interior having granulator interior walls that include a first granulator side wall, a second granulator side wall, a granulator front wall that extends transversely to the granulator side walls, and a granulator back wall that extends transversely at an opposite end of the granulator interior from the granulator front wall;
    a horizontal perforated plate that bounds the granulator interior in a downward direction;
    a seed entry opening;
    a granule exit opening disposed at a distance in front of the granulator back wall; and
    deflection plates in the granulator interior configured to cause a deflection of a flow of granule particles in the granulator interior such that the granule particles are deflected at least once in a direction other than an initial flow direction toward the granule exit opening, wherein the deflection plates are arranged in a U-shape or such that the deflection plates ensheath the granule exit opening.

2. The fluidized bed granulator of claim 1 wherein the granule exit opening is disposed within the horizontal perforated plate.

3. The fluidized bed granulator of claim 1 wherein the deflection plates are configured to cause multiple deflections of the flow of the granule particles in the granulator interior that are different than the initial flow direction toward the granule exit opening.

4. The fluidized bed granulator of claim 1 wherein the deflection of the flow of the granule particles in the granulator interior is by 180° relative to the initial flow direction.

5. The fluidized bed granulator of claim 1 wherein the deflection plates include a deflection plate that extends generally in the initial flow direction of the granule particles or at an acute angle to the initial flow direction and is disposed at a distance from the granulator side walls.

6. The fluidized bed granulator of claim 1 wherein the deflection plates form an acute angle with one another, form a right angle with one another, or are arranged parallel to one another.

7. The fluidized bed granulator of claim 1 wherein the deflection plates include:
    a first deflection plate that extends generally in the initial flow direction of the granule particles; and
    a second deflection plate that extends in front of the granule exit opening transverse to the initial flow direction of the granule particles.

8. The fluidized bed granulator of claim 1 wherein the granule exit opening is surrounded on two or three sides by deflection plates, by no deflection plate, or by a deflection plate with an opening disposed opposite the granulator back wall.

9. The fluidized bed granulator of claim 1 comprising at least one of:
    a second seed entry opening disposed in the granulator front wall;
    seed entry openings in the first granulator side wall; or
    seed entry openings in the second granulator side wall.

10. The fluidized bed granulator of claim 9 wherein the second seed entry opening, the seed entry openings in the first granulator side wall, and/or the seed entry opening in the second granulator side wall are disposed in conjunction with a growth zone.

11. The fluidized bed granulator of claim 1 wherein the granule exit opening is disposed within the horizontal perforated plate and is spaced apart from and does not touch the granulator back wall.

12. The fluidized bed granulator of claim 1 wherein above the horizontal perforated plate the granulator interior is divided into growth zones and cooling zones, as viewed in a flow direction.

13. The fluidized bed granulator of claim 12 comprising dividing walls disposed between the growth zones and the cooling zones, wherein the dividing walls have passage openings.

14. The fluidized bed granulator of claim 12 wherein the granule exit opening is disposed within a cooling zone.

15. The fluidized bed granulator of claim 5 wherein the deflection plate is configured as a portion of a dividing wall.

16. The fluidized bed granulator of claim 1 wherein the granule exit opening is connected via a coarse screen to a conveying device.

17. The fluidized bed granulator of claim 16 wherein the conveying device is connected to a downstream screen apparatus.

18. The fluidized bed granulator of claim 16 wherein in a flow direction of granule particles the conveying device is disposed at a distance of 20% to 80% of a total length of the first granulator side wall or of the second granulator side wall.

19. The fluidized bed granulator of claim 1 wherein the granule exit opening is connected first to a coarse screen followed by a separate fluidized bed cooler.

20. The fluidized bed granulator of claim 1 wherein the horizontal perforated plate has inclined openings at an angle of 20° to 60° relative to a surface of the perforated plate.

21. The fluidized bed granulator of claim 20 wherein the inclined openings are inclined in different directions.

22. The fluidized bed granulator of claim 1 wherein one or both of the granulator side walls is arranged vertically.

23. The fluidized bed granulator of claim 1 wherein one or both of the granulator side walls, as viewed in a vertical direction, is in an inclined arrangement from a center line of the fluidized bed granulator outward.

24. A fluidized bed granulator for production of granules that contain urea or nitrate, the fluidized bed granulator comprising:

a granulator interior having granulator interior walls that include a first granulator side wall, a second granulator side wall, a granulator front wall that extends transversely to the granulator side walls, and a granulator back wall that extends transversely at an opposite end of the granulator interior from the granulator front wall;

a horizontal perforated plate that bounds the granulator interior in a downward direction;

a seed entry opening;

a granule exit opening disposed at a distance in front of the granulator back wall; and deflection plates in the granulator interior configured to cause a deflection of a flow of granule particles in the granulator interior such that the granule particles are deflected at least once in a direction other than an initial flow direction toward the granule exit opening;

wherein the first granulator side wall and the deflection plates are arranged to form a U-shape or such that the first granulator side wall and the deflection plates are arranged to ensheath the granule exit opening.

25. The fluidized bed granulator of claim 24 wherein the deflection plates are configured to cause multiple deflections of the flow of the granule particles in the granulator interior that are different than the initial flow direction toward the granule exit opening and the deflection of the flow of the granule particles in the granulator interior is by 180° relative to the initial flow direction.

26. The fluidized bed granulator of claim 24 wherein the granule exit opening is connected first to a coarse screen followed by a separate fluidized bed cooler.

27. A fluidized bed granulator for production of granules that contain urea or nitrate, the fluidized bed granulator comprising:

a granulator interior having granulator interior walls that include a first granulator side wall, a second granulator side wall, a granulator front wall that extends transversely to the granulator side walls, and a granulator back wall that extends transversely at an opposite end of the granulator interior from the granulator front wall;

a horizontal perforated plate that bounds the granulator interior in a downward direction;

a seed entry opening; and a granule exit opening disposed at a distance in front of the granulator back wall;

wherein the granule exit opening is connected first to a coarse screen followed by a separate fluidized bed cooler.

\* \* \* \* \*